US005126769A

United States Patent [19]

Lewicki, Jr. et al.

[11] Patent Number: 5,126,769

[45] Date of Patent: Jun. 30, 1992

[54] NON-ELECTROGRAPHIC PRINTER WITH LAMINATION MEANS

[75] Inventors: Walter J. Lewicki, Jr., Lancaster, Pa.; John H. Bowers, Clarksburg, N.J.

[73] Assignee: Armstrong World Industries, Inc., Lancaster, Pa.

[21] Appl. No.: 628,199

[22] Filed: Dec. 14, 1990

Related U.S. Application Data

[63] Continuation-in-part of Ser. No. 510,081, Apr. 17, 1990, abandoned, and Ser. No. 510,067, Apr. 17, 1990, and Ser. No. 510,130, Apr. 17, 1990.

[51] Int. Cl.[5] .............................................. G01D 15/06

[52] U.S. Cl. ................................ 346/153.1; 346/157; 346/159

[58] Field of Search ..................... 346/153.1, 157, 159, 346/160.1, 151, 74.2, 74.7, 76 R, 107 R, 160; 355/200; 118/644, 645

[56] References Cited

U.S. PATENT DOCUMENTS 4,286,031 8/1981 Kuehnle et al. ...................... 430/44
4,458,258 7/1984 Amaya et al. .................... 346/153.1
4,504,837 3/1985 Toyoda et al. ....................... 346/1.1
4,514,744 4/1985 Saitoh et al. ..................... 346/153.1
4,754,294 6/1988 Kato .................................. 346/160

*Primary Examiner*—George H. Miller, Jr.
*Assistant Examiner*—Randy W. Gibson
*Attorney, Agent, or Firm*—James J. Ralabate

[57] ABSTRACT

This invention involves both a process and apparatus for printing an image on a removable thicker dielectric layer than conventionally used in other systems. The process and apparatus can have one or more image-toning stations on a conductive substrate. When multiple stations having separate imaging and toning means are used, complicated image registration structures are avoided. The dielectric layer used is at least 0.2 mils thick and is removed from the system after it is imaged, developed, fixed and laminated or overcoated with a layer of the same family resin as used in the dielectric layer or layers. The imaged and overcoated layer may be attached to substrate such as a tile or wallpaper base, either before or after the process of this invention is completed. The overcoating substantially strengthens the dielectric layer in addition to overcoating the image. The final colored image (or monochrome) is removed from the printing apparatus after the overcoating is laminated thereon.

53 Claims, 6 Drawing Sheets

SEE Fig. 1A
SEE Fig. 1B
SEE Fig. 1C

SEE Fig. 2A
SEE Fig. 2B
SEE Fig. 2C
1
2
21
22
23
24
24A
25
26
27
28
29
30
31
32
33
34
35

SEE Fig. 3A
SEE Fig. 3B
SEE Fig. 3C
1
2
36
37
38
39
40
41
42
43
45
46
47
48
49
50
51

NON-ELECTROGRAPHIC PRINTER WITH LAMINATION MEANS

This invention relates to a novel printing system and, more particularly, to a system utilizing ion projection technology. This application is a Continuation-in-Part application of U.S. patent application Ser. Nos. 07/510,081 now abandoned; 07/510,067 and 07/510,130 and filed Apr. 17, 1990.

BACKGROUND OF THE INVENTION

There are known various systems utilized in electrographic printing. Generally, these systems use a pattern of charge which corresponds to a desired image. This charge is deposited upon photoconductive or dielectric surface of a drum or belt. This surface bearing the latent electrostatic image is moved through a toner station where a toning material of opposite charge adheres to the charged areas of the dielectric surface to form a visible image. The drum or belt is advanced forward and the toned image is either transferred to a receiving media or fused directly on the charged surface. After the fusing operation in the transfer system, the dielectric can be treated in various ways to clean its surface of residual charge or toner or both. This cleaning can be performed by any known electrostatic cleaning method.

In electrographic imaging and printing processes both photoconductive insulators and dielectrics have been used, however they are quite different from each other. Photoconductive insulators will only hold an electrical charge in the dark which makes them useful in limited applications such as copiers and the like. Dielectrics, on the other hand, can hold an electrical charge in the presence of visible light which makes them much more practical for use in commercial manufacturing processes such as the present invention.

There are also known many electrostatic printing systems such as those described in U.S. Pat. Nos. 3,023.731 (Schwertz); 3,701,996 (Perley); 4,155,093 (Fotland); 4,267,556 (Fotland); 4,494,129 (Gretchev); 4,518.468 (Fotland); 4,675,703 (Fotland); and 4,821,066 (Foote). All of these systems disclose non-impact printing systems using electrostatic images that can be made visible at one or multiple toning stations. In those systems ions are projected from an ion-generating means onto the surface of a dielectric layer by a print head such as described by Fotland in U.S. Pat. No. 4,155,093 or in U.S. Pat. No. 4,267,556. Generally, the print head comprises a structure of two electrodes separated by a solid dielectric member, a solid dielectric member and a third electrode for the extraction of ions. The first electrode is a driver electrode and the second is a control electrode; both are in contact with the separating dielectric layer. There is an air space at a junction of the control electrode and the solid dielectric member. A high voltage high frequency discharge is initiated between the two electrodes creating a pool of negative and positive ions in the air space adjoining the control electrode. The ions are extracted through a hole in the third electrode by an electrostatic field formed between the second and third electrodes. In Fotland U.S. Pat. No. 4,267,556 the image-forming ion generator takes the form of a multiplexed matrix of finger electrodes and selector bars separated by a solid dielectric member. Ions are generated at apertures in the finger electrodes at matrix crossover points and extracted to form an image on a receiving member. Grey scale control is achieved by pulse width modulation of the second (finger) electrode as described in Weiner U.S. Pat. No. 4,941,313. While prior art ion projection heads are useful in many applications, they are not adapted for use in systems requiring a relatively thick and hence low capacitance dielectric imaging layer. Generally, systems using ion projection printing technology utilize powder toners. In electrography, liquid development systems are best suited to accurate rendition of grey scale images and high resolution development. The components of toner systems can contaminate the electrodes in prior art ion projection heads and can render them substantially non-functional. When liquid toners are used, contamination of the ion projection cartridge is more of a problem than it is when using traditional dry powder toners. This is because the toner particles are considerably smaller in liquid toners than dry powder toners (e.q. 1 micrometer vs 25 micrometers) and also because there is a liquid component which evaporates. Thus, there is a high likelihood that the residual toner and/or solvents will migrate to the ion projection cartridge causing a loss of ion emission efficiency or total loss of emission. Incorporation of an air knife prior to the ion projection head can reduce the exposure of the head to contamination. The air knife will prevent exposure of the ion projection head to the toner particles and solvents in liquid toners by purging the space around the ion projection head with solvent free air or other gas. In addition, prior art projection heads are not particularly desirable for grey scale printing. Improved and novel ion projection heads are required to provide improved results in systems using liquid development systems and for those striving for acceptable grey scale density. Prior art ion projection heads are not only not particularly desirable for grey scale printing, but have substantial limits concerning the number of grey scales that can be achieved. For example, most can manage only to achieve 4 grey scales.

In addition to the deficiencies in prior art print heads, the known ion projection printing systems are not specifically designed to accommodate multicolored printing systems at rapid speeds. Therefore, while ion-generating systems utilize inherently sound technology there are several major improvements that need to be found before these systems can be used to produce multicolored final products of high print quality and at rapid speeds.

SUMMARY OF THE INVENTION

It is therefore an object of this invention to provide an ion generation non-impact printing system devoid of the above-noted disadvantages.

Another object of this invention is to provide a printing system capable of providing continuous tone, magazine quality print at rapid speeds.

Another further object of this invention is to provide an efficient printing system capable of high speeds with an improved image registration means.

Still yet another object of this invention is to provide an electrographic printing system wherein substantially thicker, lower capacitance dielectric layers may be used and capable of providing accurate renditions of grey scale images.

A still further object of this invention is to provide a non-impact printing system that can be used in the manufacture of relatively thicker final products.

Still another object of this invention is to provide an electrographic printing system that is particularly suitable for high speed color systems utilizing liquid toners.

Another yet further object of this invention is to provide a novel electrographic printing system suitable for both direct and transfer imaging.

Another still further object of this invention is to provide a non-impact printing system capable of producing continuous tone, magazine quality prints at rapid speeds.

Still yet another object of this invention is to provide a novel system and apparatus for manufacturing products bearing colored images of improved quality, density and resolution.

Another object of this invention is to provide a non-impact printing system capable of producing images having up to 32 levels on the grey scale.

The foregoing objects and others are accomplished according to this invention by providing a printing system capable of using organic dielectric layers up to about 10 mils thick. In the present system these thicker dielectric layers are electrostatically imaged by the use of a novel print head. After the novel print head deposits the latent image on the surface of the dielectric , a novel liquid toner comprising substantially the same resin as in the dielectric is used to form a visible image. While the process of the present invention can be used for monochromatic printing it is particularly suitable for use in a multicolor system. Also the present novel system is capable of substantial improvement in grey scale rendition. For example, it can provide up to 32 levels on the grey scale. In a multicolor system the imaged dielectric imaging layer progressively passes through a series of development stations each containing the appropriate colored toner. Each toner is responsive to selective latent images corresponding to the multicolored image in the desired final color balance. Registration of the resulting color images may be achieved by any known registration means such as that disclosed in U.S. Pat. No. 4,821,066. The accuracy of the registration can be controlled by the proper sensing mechanism. In addition, it is important to the present invention that the appropriate toner particle be used, i.e. one which will respond to pressure, solvent, spray, heat or other appropriate fixing without any substantial deformation of the toner particle. An important aspect of this invention is the use of a toner or toning material containing the same resin as the resin used in the dielectric layer. By the "same" is meant the identical resin or a resin from the same family such as polyvinylchloride and copolymers of vinylchloride with minor portions of vinyl acetate, etc.

Extreme care must by taken to avoid defects in the dielectric layer. Defects such as pinholes in the dielectric layer can cause complete breakdown of the system because of charge leakage, charge bleeding or other electrical imperfections associated with the integrity of the latent image. Some dielectrics useful in the present system include organic resins such as acrylics like polymethyl methacrylate, vinyl-based polymeric materials, and other suitable organic resins including polyimides listed later in this disclosure. Also, the dielectric used must not be affected by elevated temperatures or high humidities. In addition, the dielectric must have substantial dielectric strength, high charge acceptance and relatively low charge leakage rates. These are influenced by relative humidity (because of moisture absorbance of some materials) and temperature because some dielectric materials lose their dielectric properties at elevated temperatures. As noted earlier, it must be substantially free of any pinholes and must have the proper built in adhesive characteristics in order to bond to toners, other layers or bases in any post-printer lamination steps. Dielectrics for use in this invention must be those that offer all of the above qualities such as the organic resins above noted. Other known thick non-organic dielectric materials such aluminum oxide, glass enamels and the like should be carefully avoided because of their tendency to crack under stress thereby creating cracks and surface defects. Also, because of their relative affinity to water, they could cause another electrical leakage path and supply the ions that cause dielectric absorption. If found to be suitable however, some inorganic materials can be combined with the organic dielectrics of this invention. The resistivity of the dielectric layer of the present invention should be at least $10^{12}$ ohm-centimeters. As noted earlier, it is also important that the dielectric have a high charge acceptance and substantial dielectric strength.

The charge image is created on the dielectric layer as above mentioned by a novel print head which is modified specifically to function with the thicker dielectric layers of this invention. Generally, in ionographic systems, the head used creates relatively high voltage high frequency discharges which are initiated between two electrodes. This discharge creates a pool of negative and positive ions in the air space adjoining the finger electrode. The negative ions are accelerated by a positive field resulting in a deposition of a charge on the surface of the dielectric layer thereby forming the latent image. As earlier explained, existing printer heads are not usable in the present invention because the number of ions deposited per FR cycle is too great. A novel print head is required to provide the necessary charge and image characteristics required in the system of this invention. Generally, this novel print head differs from typical prior art print heads (such as that disclosed in U.S. Pat. No. 4,160,257) in the following ways: (1) it has greater spacing between the finger and screen electrodes, (2) addition of an additional screen electrode beyond the first, (3) change the diameter of the hole in the finger electrode and (4) any combination of the above.

The air knives may incorporate additional apertures near the ion projection head to introduce an inert gas, preferably nitrogen, in the vicinity of the ion projection head to prevent exothermic chemical reactions that may take place during ionization, thereby substantially reducing the operating temperature of the ion projection head.

Liquid toner is highly preferred in the present system over dry toner because of the grey scale capability, increased density, density control and resolution attainable. The following considerations are important in selecting the liquid toner of this invention: (1) color stability when exposed to ultra-violet light, (2) color stability when bound in a system with plasticizer and exposed to elevated temperatures, (3) color gamut achievable with the toners, (4) ability to obtain the maximum optical density desired, i.e. (1.7) and (5) ability to obtain the desired optical density over the range of voltages or charge used in the invention (q/m ratio).

In the present system, the toned image can be fixed by conventional means such as heat, solvent, pressure spray fixing or other appropriate fixing means. Typical fixing means are defined in U.S. Pat. Nos. 4,267,556;

4,518,468 and 4,494,129. Since the dielectric layer is removed from the conductive substrate at the conclusion of the process, cleaning of residual charge or contamination is not required.

The dielectric may be deposited upon a conductive endless belt, a conductive drum or other conductive substrates by any suitable means which provide a substantially defect-free surface. The term "conductive substrate" or "drum" used throughout this disclosure and claims includes conductive drums, belts, endless belts or combinations thereof. In some instances a belt and a drum may be used in the same system.

In one or a first embodiment of the invention a liquid dielectric formulation is deposited on the upper surface of a conductive continuous belt. This dielectric layer is then passed through means to cure and to remove the liquid or solvent forming thereby a continuous dielectric layer on the belt. This continuous layer must after curing be capable of receiving and holding a latent electrostatic charge. The dielectric layer is preferably about 0.2 to about 1.5 mils thick but can be up to about 10 mils thick if suitable. An endless belt is preferred in some instances over a drum because of space considerations, uniformity of procedure and tolerances, better control of dielectric layer when deposited as a liquid, ease of separation of product and to provide a more energy efficient system.

Another method of providing a dielectric layer on the conductive substrate surface is by using a preformed dielectric film. This film is usually conveyed to the endless belt from a spool or other dispensing means. It is unwound upon the conductive belt and an adhesive applied to effect at least temporarily secure contact with the belt. Alternately, a thin permanent dielectric may be made part of the conductive endless belt and charged to a known potential by any standard means. The preformed dielectric film may be oppositely charged and then applied to the charged dielectric side of the conductive endless belt thereby creating and electrostatic field and hence a force which strongly attracts the preformed dielectric film to the conductive endless belt. The contact must be secure enough to allow the dielectric layer to be advanced and processed through each station but ultimately removable at the separation station. Once the dielectric layer is formed on the conductive belt it is discharged by conventional means to provide an electrically clean, uncontaminated surface able to accept a sharp imagewise ionic charge. After the novel print head of this invention is used to deposit the latent image upon the dielectric layer, the endless belt and the imaged dielectric layer pass through a development station where the dielectric is toned by use of a novel liquid toner. This liquid toner contains a resin which is of the same family as used in the dielectric, i.e. of the vinyl, acrylate or polyester families. Once the image is toned it is passed through a heat evaporation station and/or a fixing station such as a heated platen or fuser rolls. As noted earlier, pressure fixing, spray fixing or other suitable fixing means may be used if desired.

Once the image is fixed to the dielectric, the dielectric layer may be laminated and then removed or can be further attached onto a thicker base structure. In a preferred embodiment a clear overcoating substance such as polyvinylchloride film is laminated onto the imaged dielectric layer forming a final product. Alternatively, it can be used as only the imaged component of a final product. This clear overcoating laminate also provides stability to the imaged dielectric layer and prevents it from shrinking or becoming deformed upon cooling. Upon lamination of the clear overcoating to the dielectric, an adhesive which facilitates adhesion of these two layers is preferably used.

The final imaged product is comprised of a dielectric layer, preferably a clear or white dielectric about 0.2 to 1.5 mils thick having a clear overcoated laminate of from 3–20 mils, and a substrate having a thickness of about 60–100 mils. In one embodiment of this invention a top or overcoating layer of polyvinylchloride or other visually clear material is deposited over the imaged surface of a white dielectric. The clear overcoating may be thinner than 3 mils for products which would not require abrasion resistance such as a decorated ceiling tile and it may be applied as a formulation using conventional spray, roller coating and drying means. In a multicolored system this laminate or overcoating is applied after the final color is fixed on the dielectric layer. However, if it is desired to give an illusion of depth to the developed image, this thin clear film or overcoating is deposited over each monochrome colored image sequentially after each is fixed. These thin clear films are approximately 2.5 mils thick but can be any suitable thickness depending upon the desired result. When an illusion of image depth is desired, the first dielectric layer is preferably white and the subsequent dielectric layers are colorless. All of the dielectric layers can however be colorless if this enhances the desired results. There are several versions of the present process especially those involving subsequent or post system treatments. For example, in a post treatment procedure, any substrate such as those used in wallpaper bases, tile base structures or any other decorative item may be combined with the imaged dielectric layer.

In a second embodiment of this invention a printing system is provided utilizing a thick low capacitance dielectric layer (up to about 10 mils) on a conductive drum rather than a belt as in the first embodiment. Two or more novel ion projection heads coupled with respective color toning systems are located around the conductive drum whereby the drum is driven by this thick dielectric layer or by any other means. Moving the drum by "power" means includes the dielectric layer driving the drum or a power source such as electricity or the like moving the drum. There is no conventional station-to-station registration required since each toning station will develop only the latent image presented to it by the previous ion projection head. Registration is precisely accomplished electrically by this invention without the need for complex or complicated registration devices. The novel ion projection head or cartridge used consists of a cartridge-mounting apparatus incorporating "air knives", one on either side of the cartridge. These air knives are essentially apertures parallel to the axis of the drum through which pressurized air is made to flow. The apertures are designed such that they cause a pressure gradient approximately tangential to the drum surface and away from the cartridge, and such that they produce turbulence. In This manner, remaining toner solutions or solvents (such as ISOPAR) are evaporated from the drum surface and the remaining toner particles are swept away from the drum surface. The air knives may incorporate additional apertures near the ion projection head to introduce an inert gas, preferably nitrogen, in the vicinity of the ion projection head to prevent exothermic chemical reactions that may take place during ionization, thereby substantially reducing the operating temperature of the ion projection head. Also, there are means in the ion projection cartridge that allow control of the rate of charging. This is important for improved grey scale printing on a dielectric layer. A feature of the present system is its ability to provide up to 32 levels on the grey scale at each color unit station.

The process and apparatus of the present invention are particularly designed for use in a multicolor printing system. The thicker dielectric layer of from about 0.2 mils to about 10.0 mils is provided to the surface of a conductive drum. This layer may be provided by any suitable means such as film from a dispensing roll or spool. As earlier noted for best results it is preferred to use a dielectric layer having a thickness of from about 0.5 to about 3.0 mils. It is important that the dielectric film or layer be substantially free of surface defects when positioned on the conductive substrate and must have the strength and proper built-in adhesive characteristics to bond to the toner particles to be used. Dielectric materials preferred for use in this invention include organic resins such as polyvinylchloride, polymethylmethacrylate, non-porous vinyl films consisting of: polyvinylchloride copolymers of vinyl chloride with minor portions of other materials such as vinyl acetate, vinylidene chloride, and other vinyl esters such as vinyl proprionate, vinyl butyrate, as well as alkyl substituted vinyl esters. Although the dielectrics based on polyvinylchloride are preferred, the invention has broad application to other polymeric materials consisting of: polyethylenes, polyacrylates, e.g. polymethylmethacrylate, copolymers of methyl methacrylate such as methyl n-butyl methacrylate, polybutylmethacrylate, polybutylacrylate, polyurethane polyamides, polyesters, polystyrene and polycarbonates. Typically, films made from poly(vinylchloride), polyurethane, polyesters, polyacrylates, and mixtures of same copolymers made therefrom may be used. Known thick non-organic dielectric materials such as aluminum oxide, glass, enamels and the like should be avoided when used alone because of their tendency to crack and their relative affinity to water. If suitable, however, some non-organic materials may be combined with the preferred organic resin dielectrics of this invention. After the organic resin dielectric film or layer is image charged by the first novel print head of this invention, it is advanced to a first toning station and then to a series of print head-toning stations. Each of the toning or development stations will tone the latent image presented to it by the print head at that station. Each toning station or unit will provide a different color toner so that only each selective latent image will attract toner thus resulting in a final electrically-registered colored image. For example, after the film of dielectric is supplied to the surface of a conductive drum, and after it is surface discharged, it can pass to a first station where an initial latent image is deposited upon the dielectric layer and toned by a black toner. After being toned and fixed by any suitable means, the dielectric is advanced to a second station where a second latent image is deposited and toned with a cyan toner. After the toned image is fixed, the dielectric layer is advanced to a third station where a third latent image is deposited and toned with a magenta toner. After fixing, the dielectric is moved to a fourth station where a fourth latent image is deposited and developed or toned by a yellow toner, etc. After the final imaging-toning station the color registered image is sprayed with an overcoating to fix the combined image in place. The overcoating can be used as a final coating or as an adhesive (heat-activated) to combine with other overcoatings. In a preferred embodiment, a clear substance such as polyvinylchloride is used to overcoat the imaged dielectric layer. Other suitable overcoating may be used. Typical lamination overcoating materials could be used such as nonporous vinyl films consisting of poly(vinylchloride), copolymers of vinylchloride with minor portions of other materials such as vinyl acetate, vinylidene chloride, and other vinyl esters such as vinylproprionate, vinylbutyrate, as well as alkyl substituted vinyl esters. Although the dielectrics based on poly(vinylchloride) are preferred, the invention has broad application to other polymeric materials consisting of polyethylenes, polyacrylates, (e.g. polylmethylmethacrylate), copolymers of methylmethacrylate such as methyl/n-butylmethacrylate, polybutylmethacrylate, polybutylacrylate, polyurethane polyamides, polyesters, polystyrene and polycarbonates. Also, copolymers of any of the foregoing or mixtures of the foregoing may be used. When this overcoating is applied to the dielectric layer, an adhesive which facilitates adhesion of the two layers can be used. The finally imaged dielectric layer is then removed from the drum and prepared for any post processing. The thickness of the overcoating, i.e. 3.0 to 20.0 mils is important to the structure of the present invention. At least 3.0 mils is required to strengthen the dielectric layer; less than 3.0 mils of overcoating does not provide the desired structural strength to the thin dielectric layer. When a floor covering final product is desired, up to 20.0 mils of overcoating provides the abrasion resistance required; over 20.0 mils would be as effective, however would be an overkill since 20.0 mils is more than adequate to provide the necessary protection to the decorative imaged dielectric layer and the necessary abrasion resistance for even floor tile.

In the second embodiment each toner development station means comprises a specific colored liquid toner having preferably a resin of the same chemical family as the resin used in the dielectric layer. After the liquid toner contacts the latent image, the solvent or liquid component of the liquid toner is removed by any appropriate means such as an evaporation chamber or a heated platen. After the liquid component is removed from the imaged surface, the layer is then passed through appropriate fixing means. Any suitable fixing means can be used such as pressure fixing, heat fixing, spray fixing or other appropriate fixing means. Combinations of fixing means may be used if desired. Various suitable liquid toners may be used. Typical liquid toners useful in this invention are manufactured by Hilord Chemical Corp., Hauppauge, N.Y. and manufactured by Research Labs of Australia. The final overcoated imaged dielectric layer can be combined with a thicker substrate or can be used itself as the final product. If desired, an additional station can be used in the system where a substrate is provided before the separation station.

The dielectric layer used is a clear, colored or white dielectric that could be from about 0.2 to 10.0 mils thick but preferred to be from about 0.5 to about 3.0 mils thick. An overcoated laminate is used of from 3–20 mils thick and the substrate that is later adhered thereto is preferably about 60–100 mils thick. In one embodiment of this invention a top layer of polyvinylchloride or other visually clear material is overcoated over the imaged surface of the white or clear dielectric. In this multicolored system this laminate or overcoating is applied after the final color is fixed on the dielectric layer. However, if it is desired to give an illusion of depth to the developed image, this thin clear film or laminate is deposited over each monochrome colored image sequentially after each is fixed. These thin clear films are approximately 2.5 mils thick but can be any suitable thickness depending upon the desired result. When an illusion of image depth is desired, the first dielectric layer can be white or colored but the others are colorless. All of the dielectric layers can also be colorless if this enhances the desired results. There are several versions of the present process especially in those with subsequent or post system treatment. For example, as above noted, any substrate such as those used in wallpaper bases, tile base structures or any other decorative item may be combined to the imaged dielectric layer.

EXAMPLES AND PREFERRED EMBODIMENTS

The following are examples of the specific non-impact printing process of the present invention. Examples 1-4 illustrate typical procedures using the endless belt of the first embodiment of this invention while examples 5-8 are illustrative of a second embodiment using a drum as the conductive substrate.

EXAMPLE #1

A dielectric vinyl coating made from a formulation consisting of 20% solids of VAGH resin, manufactured by Union Carbide, in a methylisobutylketone solvent (MIBK) was applied to a 3 mil thick stainless steel belt using a knife coater. It was dried in an oven at 130° F. with the resulting thickness being 0.5 mil. The coated stainless steel belt was conveyed past an ac discharge corona to neutralize the surface of the dielectric coating. An S3000 ionographic print head manufactured by Delphax Systems, Mississauga, Canada, in combination with a nitrogen environment was used to apply charge to the dielectric coating. The nitrogen formed an inerting and cooling blanket between the bottom screen of the print head and the dielectric coating.

Pulse width modulation of the head supplied by a separate electronics package varied between 0.8 and 2.2 microseconds in 16 equally timed increments. The charge was applied to the dielectric coating in the form of a checkerboard pattern having different levels of charge. The dielectric was then toned with a cyan liquid toner (CPA-04) supplied by the Research Labs of Australia, Adelaide, Australia. The toner was at a 4% concentration in ISOPAR G. The developing system used was a three roller type used by the Savin Corp., Stamford, Conn. in the 7450 photocopier, and adapted for this process. After evaporation of the ISOPAR using a combination of heated air and a heated platen on the backside of the stainless steel belt, the surface temperature measured 100° F. The toner was fixed to the surface of the dielectric coating using a 16.7% solids of VAGH resin in a solvent blend of MIBK and methylethylketone (MEK). The process for fixing was spray fixing followed by drying using heated air.

While the dielectric coating was still attached to the stainless steel belt it was conveyed through a pair of laminating rolls where a 3 mil thick clear rigid polyvinyl chloride film made by Klockner Pentaplast, Gordonsville, Va. was applied to the fixed toned surface of the dielectric. The temperature of lamination was 250° F. The total structure was then cooled to ambient temperature and separated from the stainless steel belt.

The resulting film showed distinct blocks of cyan color sandwiched between the dielectric coating and the 4 mil rigid polyvinylchloride film having different optical densities and demonstrated the attainment of 16 levels of grey.

This electrographically imaged structure can be further processed by laminating the dielectric side of the laminate to a 10 mil thick white vinyl coated board using a conventional flat bed press at 250° F. The laminated structure was cooled down to ambient temperature before it was removed from the press.

The resulting structure is made as a poster typically for use in the graphics art industry.

EXAMPLE #2

The electrographically imaged structure which is separated from the stainless steel belt of Example #1 can be further made into a floor tile structure. In this case, the dielectric coating will be bonded to a 60 mil thick tile base consisting of limestone and vinyl: binders, plasticizers and stabilizers. The decorated laminate removed from the stainless steel belt is subsequently combined with the 60 mil thick tile base in a heated press. The conditions of the pressing are 320° F., 30 seconds and 80 psi. After cooling to ambient temperatures, the resulting laminate structure is completely bonded to the tile base with the electrographic image fully intact.

EXAMPLE #3

A 1.5 mil rigid white polyvinylchloride dielectric film made by the Orchard Corp., St. Louis, Mo. was adhered to the stainless steel belt using the same dielectric coating as was applied in Example #1. In this case, before the YAGH coating was completely dried and at a surface temperature at 250° F. on the belt, the 1.5 mil white film was applied. The film contained a 0.2 mil coating of the same YAGH resin which was preapplied to the film using conventional rotogravure printing means. After cooling, it was corona discharged and electrographically imaged as in Example #1. The same ionographic head configuration process that was used in Example #1 was used in this example to image and tone the 1.5 mil white dielectric film. After evaporation of the ISOPAR, the toned image was fixed in a steel over rubber roller fixing nip at a surface temperature of 200° F. The fixing roller was at 125° F. to prevent the toner from lifting from the dielectric surface as it passed through the nip.

The resulting structure was removed from the belt at ambient temperatures and post laminated to the same base as in Example #2 to form a floor tile structure.

EXAMPLE #4

A 10 mil clear rigid polyvinylchloride dielectric film made by Klockner Pentaplast, Gordonsville, Va. was adhered to a stainless steel belt as described in Example #1. The film was imaged and toned using the same configuration and process as described in Example #1. After ISOPAR evaporation, the grey scale configuration was overcoated with a clear spray of a 16.7% YAGH resin in a mixture of MIBK and MEK solvents. After evaporation of the solvent using conventional drying means, the imaged and toned structure is removed from the belt after cooling to ambient temperatures.

In a subsequent step, the fixed side of the imaged 10 mil dielectric film is laminated to the surface of a 100 mil tile base consisting of limestone and vinyl: binders, stabilizers and plasticizers. The conditions of laminating are the same as described in Example #2. The resulting structure is well adhered to the tile base and is suitable for installation as a floor tile structure in high traffic areas such as shopping malls and the like.

Example #5

A 1.5 mil rigid clear poly(vinylchloride) dielectric film made by the Orchard Corp., St. Louis, Mo. was conveyed in intimate contact around a 4 inch diameter grounded aluminum drum. An S3000 ionographic print head manufactured by Delphax Systems, Mississauga, Canada in combination with a nitrogen environment was used to apply charge to the dielectric. The head was spaced approximately 10 mils above the surface of the dielectric film. The nitrogen formed an inerting blanket between the bottom screen of the print head and the dielectric.

Pulse width modulation of the head supplied by a separate electronics package varied between 0.8 and 3.4 microseconds in 0.1 microseconds increments. The charge was applied to the dielectric film in the form of a checkerboard pattern having different levels of charge. The dielectric was then toned with a cyan toner (CPA-04) supplied by the Research Labs of Australia, Adelaide, Australia. The was at a 4% concentration in ISOPAR. The developing system used was a three roller type used by the Savin Corp., Stamford, Conn. in the 7450 photocopier, and adapted for this process. After ISOPAR evaporation, the toner was fixed to the dielectric film using a 3.0 mil thick clear vinyl overlaminating film manufactured by the Flexcon Company, Spencer, Mass.

The resulting film showed distinct blocks of cyan color having different optical densities and demonstrated the attainment of 16 levels of grey.

This laminate structure can be further processed to create a floor tile structure by subsequent lamination of the white dielectric layer of the imaged and protected laminate structure using a conventional flat bed press to a 60 mil thick tile base consisting of limestone and vinyl binders, plasticizers and stabilizers.

EXAMPLE #6

A 2.7 mil rigid white poly(vinylchloride) dielectric film made by the Orchard Corp., St. Louis, Mo. was conveyed in intimate contact around a 4 inch diameter grounded aluminum drum. The same ionographic head configuration and process that was used in Example #5 was used in this example to image and tone the thicker charged dielectric film. After ISOPAR evaporation, the grey scale checkerboard image was fixed using a clear acrylic plastic spray conventionally found in graphics art stores.

This laminate structure can be further processed by spray-coating a conventional pressure sensitive adhesive to the back of the white film and laminating it to a rigid board to form an advertising poster.

EXAMPLE #7

A 1 mil clear acrylic film made by Mitsubishi Rayon Company, Ltd., Tokyo, Japan was imaged and toned using the same configuration and process as described in Example #1. After ISOPAR evaporation, the grey scale checkerboard image was fixed using a 3 mil white vinyl laminating film. The back of the white layer can then be conventionally coated with an acrylic pressure sensitive adhesive and laminated to a ⅝ inch thick inorganic mineral fiber board to form a decorated ceiling tile.

EXAMPLE #8

A 10 mil clear rigid poly(vinylchloride) dielectric film made by Klockner Pentaplast, Gordonsville, Va. was imaged and toned using the same configuration and process as described in Example #5. After ISOPAR evaporation, the grey scale configuration was overcoated using a clear spray adhesive of 16.7% solids of VAGH resin, manufactured by Union Carbide in a solvent blend of Methyl isobutyl ketone and methyl ethyl ketone, and vinyl stabilizers. After drying of the overcoat, it was laminated to a 100 mil thick layer of the same tile base as described in Example #5.

While the decorated product of Example #5 might be used as a floor tile for residential use, the end use of this example might be a commercial floor tile application where one might want a more rugged and thicker layer for exceptional wear performance.

DESCRIPTION OF THE DRAWING AND PREFERRED EMBODIMENTS

Figures 1, 1A, 1B, 1C:
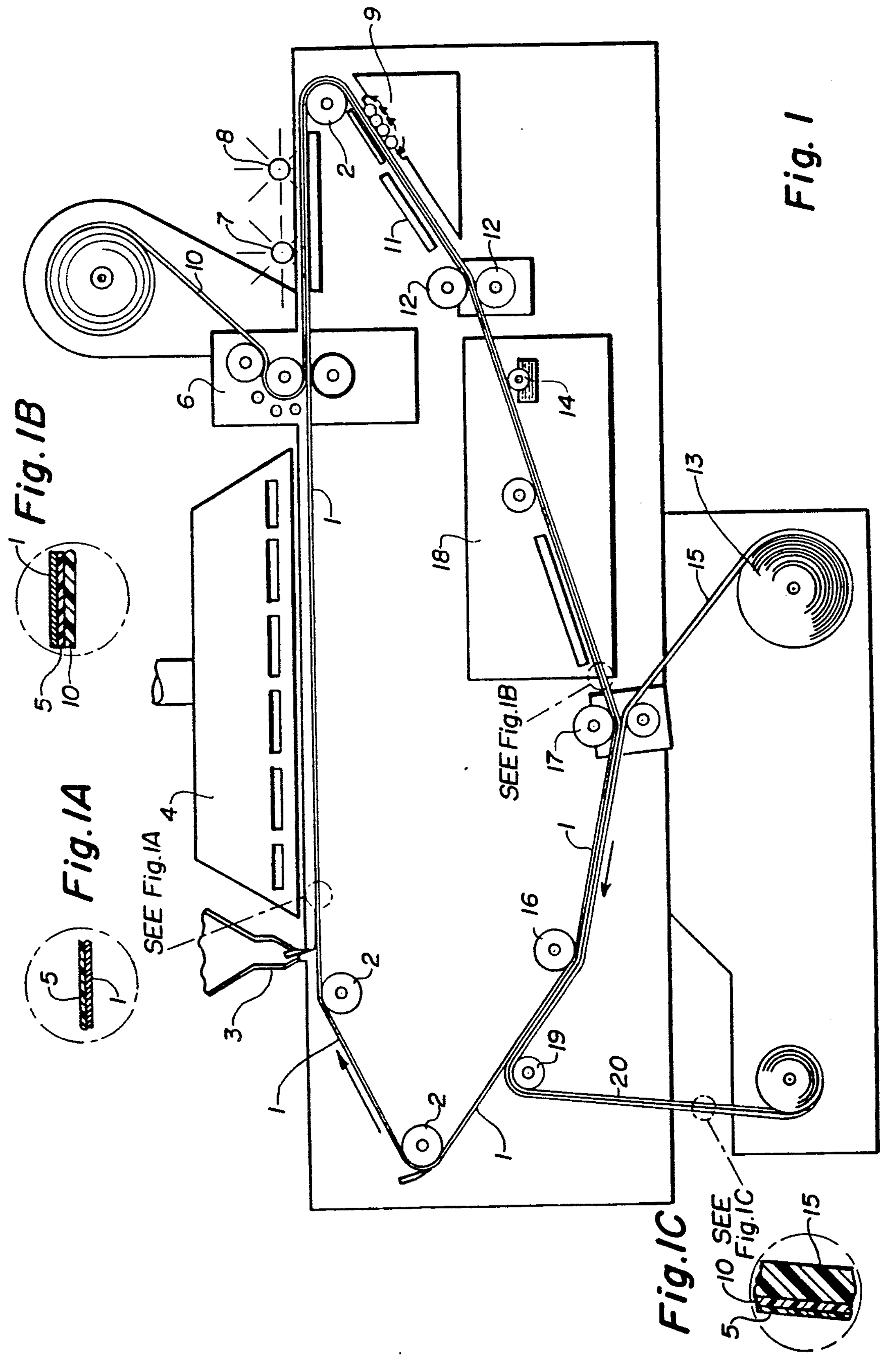
FIG. 1 is a schematic side view of the printing system of this invention as described above as the first embodiment.

For the sake of clarity in the drawings, several stations are disproportionately illustrated in relation to the entire system. Also, insignificant parts may not be shown.

In FIG. 1 a printing system is shown having an endless stainless steel or other conductive web or belt 1 which is driven by any suitable power means. This belt 1 is entrained about a series of primary rollers 2 and other suitable supporting and guiding structures. The belt 1 is driven through a series of electrographic stations which are generally similar to those used in conventional electrography or zerography, i.e. charge, develop and fixing stations. However, in the present process a substantially thicker dielectric material is used and can be coated on the belt 1 from solution, from a powder or liquid formulation. While we will describe the dielectric material as being coated from a solution, if suitable, the dielectric may be added as a powder or cured dielectric. This coating is accomplished at deposition coating station 3. After solution deposition at station 3, the belt 1 with the liquid dielectric formulation thereon is passed through an evaporation chamber 4 where the liquid or solvent of the dielectric formulation is removed, leaving a white or colorless dielectric layer 5 on belt 1. To ensure that layer 5 has a surface free of defects at least one additional thin clear or white or other colored dielectric film 10 may be provided at dielectric roll station 6. It is intended that the dielectric 5 deposited at station 3 and the dielectric film 10 supplied at station 6 now provides a final dielectric layer having a thickness of up to about 10.0 mils. Present upon belt 1 now is a two-layered dielectric material including dielectric layer 5 deposited at station 3 and dielectric film 10 deposited at film station 6. The film of dielectric 10 may have a built in adhesive material which can be activated by a heater at film station 6. As will be described below in FIGS. 2 and 3, stations 3 and 6 may be used together or separate from each other in the present system. Once surface defect-free dielectric layers 5 and 10 are deposited on belt 1, the combined dielectric layer is surface discharged by corona discharge 7 to ensure an electrically clean dielectric capable of accepting and retaining the latent image charge. When the "dielectric layer" is referred to in this FIG. 1 it is intended to include layers 5 and 10. Once the dielectric layer has been discharged by any suitable means, it is operatively passed through image station 8 which comprises an apparatus for generating charged particles in image configuration. These ions in imagewise configuration are extracted from the print head at station 8 to form the latent electrostatic image on the combined dielectric layers 5 and 10. The novel print head used in this invention is used in a nitrogen or other inert atmosphere where exothermic chemical reactions are prevented thereby substantially reducing the operating temperature of the print head. This increases the longevity of the print head and provides improved performance. Also, an air knife is used with the ion projection head which will prevent exposure of the ion projection head to toner particles and/or solvents in liquid toners by purging the space around the ion projection head with solvent-free air or other gases. The dielectric layer containing the latent image is then passed through a liquid toner at development station 9 where the latent image on it is made visible. It is preferred that the novel liquid toner used in the present invention comprises a resin of the same family as the resin used in dielectric layers 5 and 10. By using the same family of resins in both the toner and the dielectric, there is greater adhesion of the toner particle to the dielectric layer. The toned image is then passed under a heated platen 11 to evaporate the "ISOPAR" and/or other solvent from the liquid toner. "ISOPAR" is a registered trademark of EXXON. The dielectric layer is then passed through heat or pressure fix nip rolls 12 where the toned image is set or fixed to the dielectric. The adhesive resin used in the toner in addition to the above purpose, helps the toned particles adhere to each other. The dielectric layer with the image fixed or set at rollers 12 is then advanced to station 14 where an adhesive coating is placed on the imaged surface of the dielectric layer. This adhesive allows the clear overcoating 15 to bind to the imaged dielectric layer. At station or hood 18 the liquid of the adhesive is removed prior to a coating of clear overcoating 15 on the dielectric layer. A clear overcoating 15 of polyvinylchloride or other suitable material is supplied from spool or reel 13. This overcoating 15, in addition to maintaining the integrity of the image, prevents shrinkage of the dielectric layer after drying. Suitable overcoating materials include non-porous vinyl materials consisting of polyvinylchloride, copolymers of vinylchloride with minor portions of other materials such as vinyl acetate, vinylidene chloride and other esters such as vinylproprionate, vinylbutyrate as well as alkyl substituted vinyl esters. Although the overcoating based on polyvinylchloride is preferred, the invention has broad application to other polymeric materials comprising polyethylenes, polyacrylates (e.g. polymethylmethacrylate) copolymers of methylmethacrylate such as methyl/n-butyl methacrylate, polybutylmethacrylate, polybutylacrylate, polyurethane, polyamides, polyesters, polystyrene and polycarbonates. Also, copolymers of any of the foregoing or mixtures of the foregoing may be used. Typically, overcoating materials, when suitable, are films made from polyvinylchloride, polyurethanes, polyesters, polyacrylates, copolymers made therefrom and mixtures thereof. Some films of dielectrics, if suitable, can be clear, white or any other desirable color. The resulting layer is advanced to rollers 17 fixing the clear overcoating 15 layer in position onto the dielectric layer. In a color system the above process is repeated with sequential color stations until the desired colored image is obtained before overcoating. The resulting overcoated dielectric layer may be used as a final product or may be combined after separation station 19 with other substrates in post process steps. For example, a thicker substrate such as tile, wallpaper, fabric or the like may be adhered to the under surface (non-imaged surface) of dielectric layer. After passing through rollers 17 where overcoating 15 is adhered to the dielectric layer, the resulting combined layer is passed through cooling rollers (or other means) 16, and then to cooling and separation roller 19 where the final product is separated from belt 1. The final product 20 is separated from belt 1 by heating or any other suitable means to separate it from belt 1. This generally occurs at 38° C. or less when using the dielectric materials of this invention. For materials which are formulated to be subsequently heat reactivated types of adhesives as well as dielectrics, separation from belt 1 can be enhanced through the use of thin release coatings such as "Teflon*" FEP which are a permanent part of the upper surface of the conductive belt 1. (*We believe that "Teflon" is a registered trademark of DuPont.) These materials include non-porous vinyl materials comprising polyvinylchloride, copolymers of vinylchloride with minor portions of other materials such as vinyl acetate, vinylidene chloride and other vinyl esters such as vinylproprionate, vinylbutyrate, as well as alkyl substituted vinyl esters. Although the dielectrics based on polyvinylchloride are preferred, the invention has broad application to other polymeric materials consisting of: polyethylenes, polyacrylates (e.g. polymethylmethacrylate) copolymers of methylmethacrylate such as methyl/n-butylmethacrylate, polybutylmethacrylate, polybutylacrylate, polyurethane polyamides polyesters, polystyrene and polycarbonates. Also, copolymers of any of the foregoing or mixtures of the foregoing may be used. These materials can be used for the dielectric 5 or the dielectric film 10 and they can be the same or different. As earlier noted, the toned image can be fixed at station 12 by pressure, heat, spray, or other suitable fixing methods. In any of these fixing methods, especially in a multicolor system, the toner particle must be fixed without substantially distorting the toner particle or the diameter of the toner particle. This is important to maintain optimum color quality and resolution of the final color image.

The final product 20 removed at station 19 comprises a dielectric layer 5, a second dielectric layer 10 and an overcoating layer 15. The combined thickness of layers 5 and 10 is from 0.2 to about 10.0 mils and the thickness of the overcoating layer 15 is from about 3.0 to about 20 mils.

The thickness of the overcoating, i.e. 3 to 20 mils, is important to the structure of the present invention. At least 3.0 mils is required to strengthen the dielectric layer; less than 3.0 mils of overcoating does not provide the desired structural strength to the then dielectric layer. When a floor covering final product is desired, up to 20.0 mils of overcoating provides the abrasion resistance required; over 20.0 mils would be as effective, however would be an overkill since 20.0 mils is more than adequate to provide the necessary protection to the decorative imaged dielectric layer and the necessary abrasion resistance for even floor tile.

Figures 2, 2A, 2B, 2C:
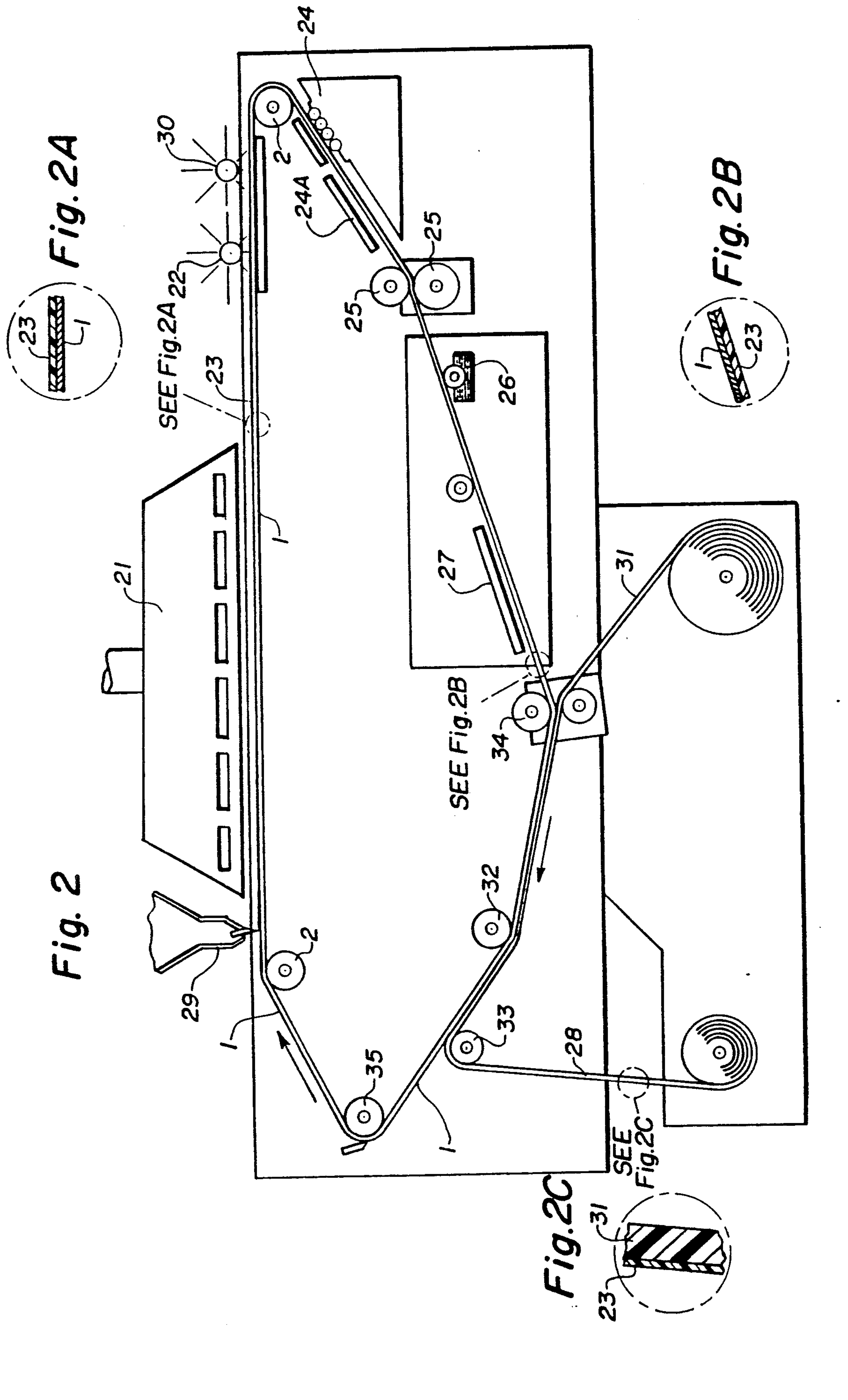
FIG. 2 is a schematic side view of another version of the first embodiment of the printing system of this invention.

In FIG. 2 a dielectric solution or dielectric liquid formulation is coated at station 29 upon an endless conductive belt 1. The liquid formulation is controlled in such a manner that upon evaporation of the solvent or liquid therefrom a dielectric layer 23 having a thickness of from about 0.2 to about 10.0 mils remains on belt 1 and the surface of the dielectric layer is free of defects. The solvent or liquid is removed by passing the dielectric solution or formulation through an evaporation chamber 21. Once the 0.2 to about 10.0 mil dielectric coating is achieved, the surface is electrically discharged by the use of a discharge corona 22 or other suitable means. After being discharged the dielectric layer 23 is charged in image configuration at station 30 by the same means as described in relation to FIG. 1. As the dielectric layer 23 progresses forward bearing with it the latent image, it passes through a developer station 24 where the latent image is toned and made visible. The liquid from the toner is removed and the toned image fixed by any appropriate means such as pressure, heat or spray fixing at fixing means 25. After it is passed through the developer station 24 including heated platen 24*a*, the toned imaged dielectric 23 is passed through fixing rollers 25. At station 26 an adhesive is applied on the imaged surface of dielectric layer 23 and this adhesive is dried at drying means 27. The adhesive now is tacky and ready to adhere to a clean overcoating 31. This overcoating is applied from an overcoating supply 31 such as polyvinylchloride. The adhesive applied also helps lock the toner into the surface of the dielectric and the application of the clear overcoating 31 encapsulates the toner between the dielectric layer 23 and the overcoating 31. The overcoating 31 not only combines with dielectric layer 23 but also prevents shrinkage of the dielectric layer 23. The combined layer is passed through heating rolls 34 and hence to cooling rolls 32 and 33 and subsequently removed as the final product at separation roll 33 (which also is a cooling roll).

The endless belt 1 is then continuously moved to an appropriate cleaning station 35 to remove any debris and is now ready to accept another layer of dielectric at coating station 29.

Figures 3, 3A, 3B, 3C:
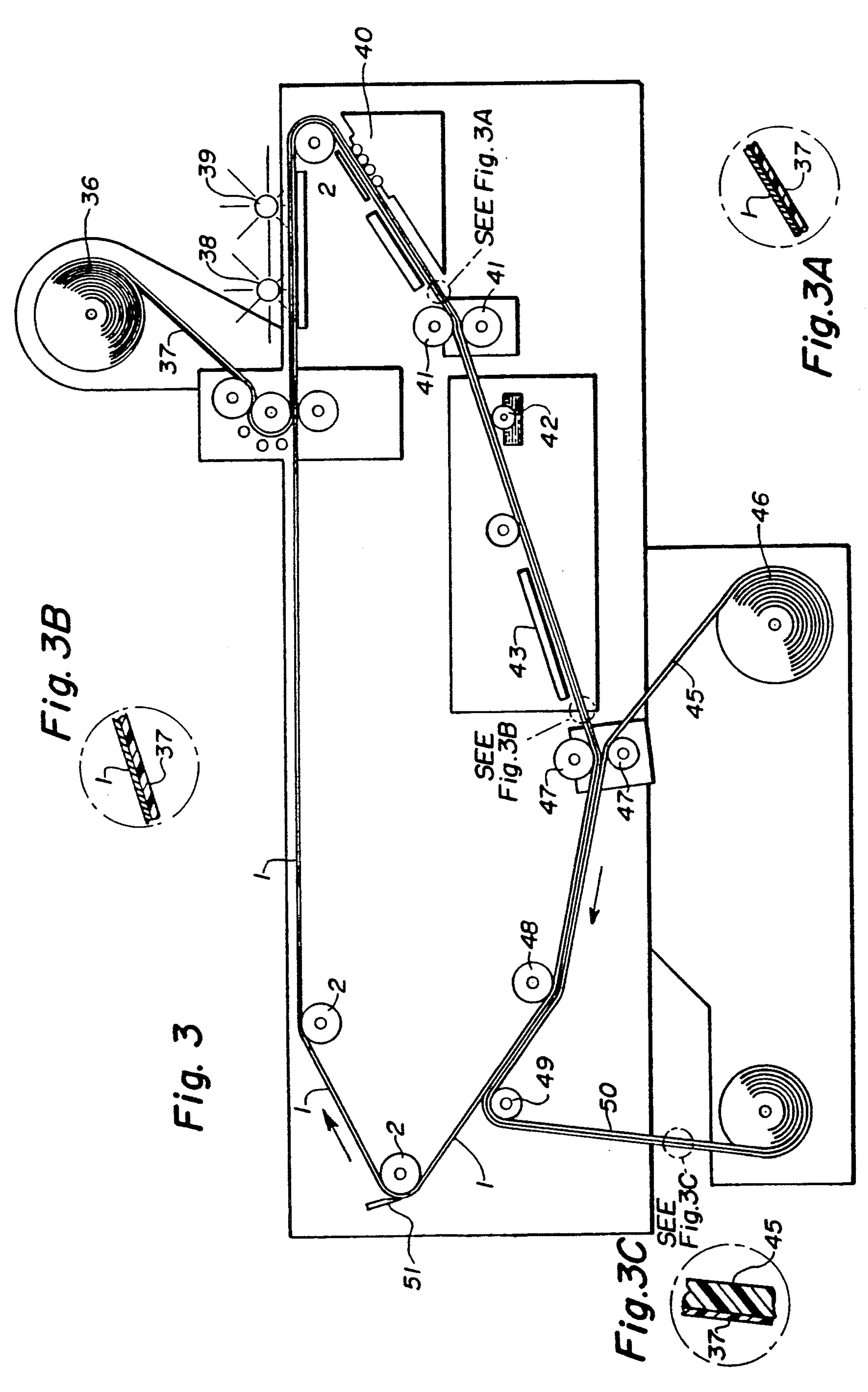
FIG. 3 is a schematic side view of another version of the first embodiment of the printing system of the present invention.

In FIG. 3 the same sequence of steps as described in FIG. 2 is followed except that rather than a dielectric solution deposited at 29 in FIG. 2 upon the endless belt 1 in FIG. 3, a spool 36 of a film dielectric material supplies the dielectric layer 37 to the surface of belt 1. This film 37 also can have a thickness of 0.2 to 10.0 mils and preferably is 0.2 to 1.5 mils. Film 37 is adhered to belt 1 by any appropriate means and the film electrically discharged at station 38. Film 37 may have an adhesive applied, if desirable. The dielectric film 37 is then image charged at station 39 (by the same method as in FIGS. 1 and 2) toned or developed at developer station 40, toner is fixed at fixing rollers or station 41. After the toner is fixed in place, the imaged film 37 is advanced to station 42 where an adhesive is applied over the imaged surface of film 37. This adhesive allows the clear overcoating to bind to the imaged dielectric layer 37. After any liquid is removed from the adhesive to make the adhesive tacky at station 43, the imaged layer 37 with the surface adhesive is advanced to station 47. An overcoating film 45 is applied from overcoating spool 46 and is then passed through heating rollers 47. The overcoated film is then passed through heating rollers 47 where the overcoating 45 is firmly pressed and fixed to the imaged dielectric layer 37. The film is then advanced to cooling roller 48 and separation roller 49 where the final product 50 is removed from belt 1. The endless belt 1 then is cleaned by cleaning blade or other means 51 and is ready for accepting another film coating of dielectric material and circulation through another "imaging cycle", i.e. imaging, developing, fixing and removal cycle.

Figure 4A:
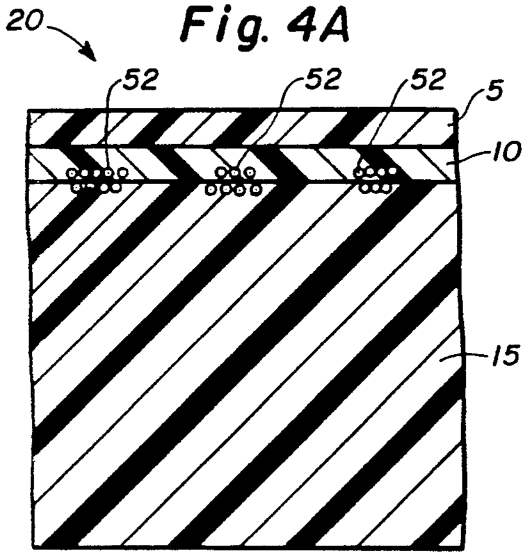
FIG. 4*a*, 4*b* and 4*c* are a sectional side view of the final product prepared by the multicolor process of this invention as described in FIG. 1, FIG. 2 and when combined with a substrate.

In FIG. 4*a* a cross-sectional side view of the final product 20 described in FIG. 1 is illustrated. The final product of the systems of FIGS. 2 and 3 would be similar to the product of FIG. 4 except they would not have two dielectric layers 5 and 10. In FIG. 2 the final product would have only layer 23 and in FIG. 3 the final product would have only layer 37. This product 20 is the result of the present system when the system of FIG. 1 is used in the multicolor mode. When more than one color toner 52 is deposited upon dielectric layer 10, each toner particle 52 has built-in resin adhesive properties which permits it to adhere to the dielectric layer 10 and to each other. The clear polyvinylchloride overcoating 15 of from about 3–20 mils thick helps encapsulate the toner and provides image and dielectric structural stability. In addition, the overcoating 15 minimizes shrinkage of the dielectric layers 5 and 10. A base or substrate may be laminated to the top surface of dielectric 5 to form a composite final product such as a tile or wallpaper. Any decorative image can be electrographically supplied thereby to any substrate used for tile, wallpaper, ceiling or floor products.

Figure 4B:
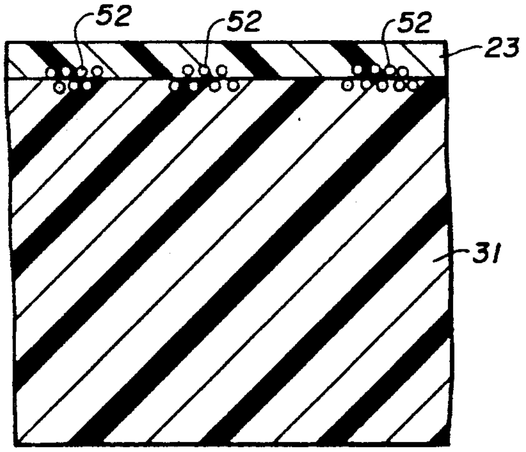

In FIG. 4*b* a cross-sectional side view of the final product of FIGS. 2 and 3 is illustrated. In both FIGS. 2 and 3 only one dielectric layer is used, i.e. layer 23 in FIG. 2 and layer 37 in FIG. 3. Both final products however will look the same, thus FIG. 4*b* shows a dielectric layer 23 with a clear overcoating layer 31. In between layer 23 and layer 31 is the fixed toner particles 52.

Figure 4C:
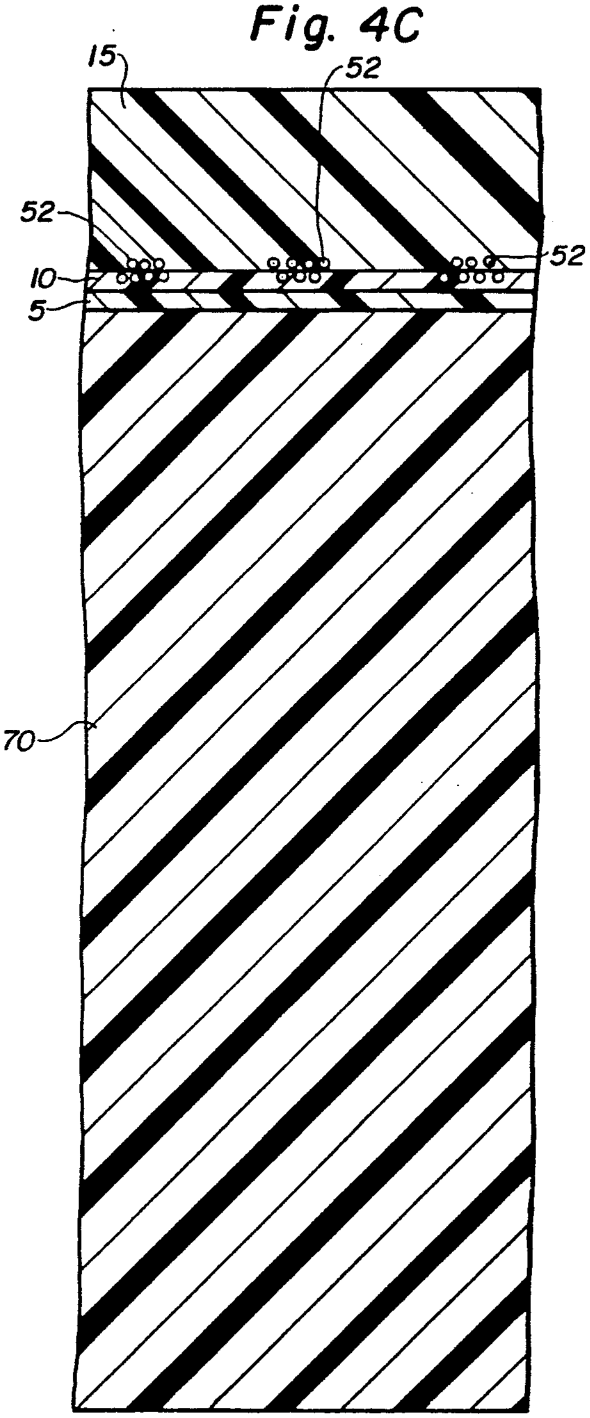

In FIG. 4*c* a cross-sectional side view of the final product of FIG. 1 is illustrated having a substrate 70 (such as tile or wallpaper) attached to the non-imaged surface of dielectric layer 5. An adhesive may be placed between any of the layers 15, 10, 5 and 70 if desired to improve adhesion. When an adhesive is used it must be clear and not interfere with the visual or chemical properties of any of the layers. Substrate 70 is merely adhered to the non-imaged surface of the dielectric by placing an adhesive between layers 5 and 70 and pressing together. Any suitable means may be used to connect substrate 70 to the surface of the dielectric layer opposite to that having or adjacent overcoating layer 15. An additional substrate station, for example, may be positioned in the systems of FIGS. 1, 2 or 3 at any location that is convenient.

In all of the described figures, means can be used to recycle the dielectric layer to the same print head for at least a second imaging at a point after the first image fixing. This embodiment would be used in lieu of the multistation system show in FIG. 5. Therefore, each of the systems shown in FIGS. 1, 2, and 3 can have any conventional means to recycle the dielectric layer (after a first image fixing) through the same stations, i.e. imaging station or print head, developer station, developer or toner liquid removal station, toner fixing station and lamination or overcoating station.

Figures 5, 5A, 5B:
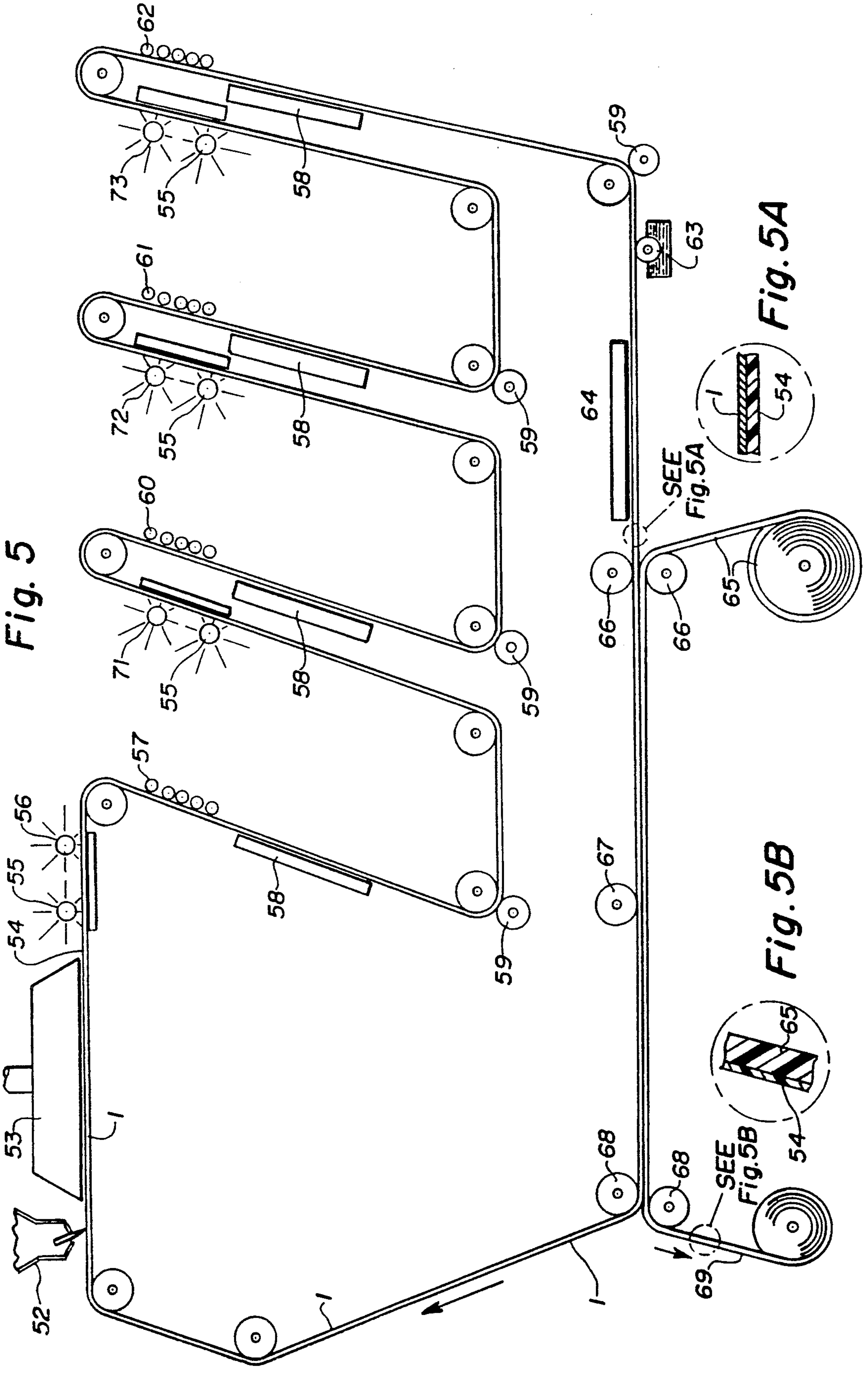
FIG. 5 is a side view of the printing system of the first embodiment of this invention utilizing a plurality of duplicate stations.

FIG. 5 shows an imaging or printing system similar to that described in FIG. 2 except in FIG. 5 a plurality of imaging and toning or developing stations are shown. In FIG. 5 a liquid dielectric is coated upon endless belt 1 at coating station 52 and the liquid evaporated off at drying chamber 53. A dielectric layer 54 up to about 10.0 mils now remains on belt 1. This layer 54 is then surface discharged at corona discharge 55 and image charged at print head 56. The latent image formed at 56 is then passed to a first developer station 57 where a liquid toner of a first color is applied. The liquid from this toner is removed at drying means 58 and the resulting toned image fixed at fixing nips or rollers 59. The imaged dielectric layer 54 is then passed through print heads 71, 72 and 73 which create latent images colorwise, and developer stations 60, 61 and 62 where different colored toners are applied and each fixed at fixing rollers 59. Each toner at stations 57, 60, 61 and 62 will selectively respond to selective latent images created by print heads 56, 71, 72 and 73 on dielectric layer 54. The finally imaged dielectric layer is then advanced to station 63 where an adhesive is applied to the image surface and at station 64 any liquid is removed from the adhesive making it tacky and ready to be combined with a clear overcoating 65. The overcoating 65 is pressed onto adhesive layer 54 and heated at rollers 66. A cooling roller 67 removes any heat from the resulting layered structure and this resulting structure passed to cool-separation rollers 68 where product 69 is removed from belt 1. Belt 1 is then cleaned and prepared for another run or cycle.

Figures 6, 6A:
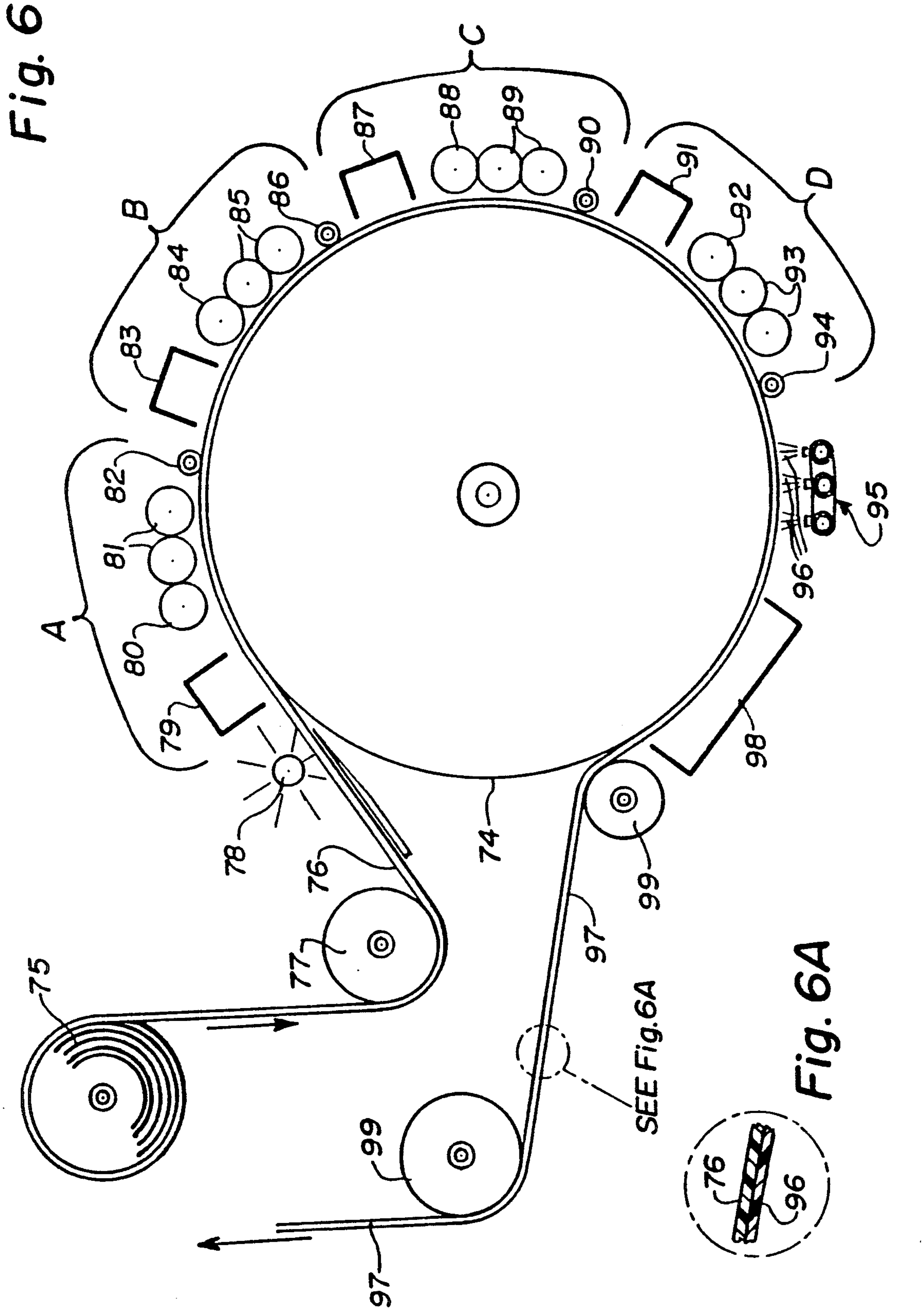
FIG. 6 is a schematic side view of the novel printing system of the second embodiment of this invention.

In FIG. 6 a second embodiment of this invention is shown wherein an aluminum conductive drum 74 is provided with any suitable means of power to rotate it upon demand. A source of a dielectric film 75 is located in flow relationship to drum 74 and is fed thereupon by a film dispensing means or source 75. A dielectric film 76 having a preferred thickness of about 0.5 to about 3.0 mils is fed around film entrained roller 77 and over the surface of drum 74. The dielectric film used is a white dielectric composed of poly(vinylchloride), however, any of the above-noted dielectric materials may be used if suitable or more appropriate. As the dielectric film 76 approaches unit station A it is surface discharged by a discharge corona 78 to ensure an electrically clean dielectric layer 76 capable of accepting and retaining the latent electrostatic charge. A corona discharge 78 may be used in the system before each station A–D if desired. For the sake of clarity, corona discharge 78 is shown in the drawing only before station A. Once the dielectric layer 76 is discharged, it is operatively advanced to station A where an ion print head 79 deposits a first charge thereon in image configuration. While still at station A this latent image is contacted with a black toner material from toner reservoir 80 said toner designated BPA-06 manufactured by Research Labs of Australia, Adelaide, Australia. After the black liquid toner is attracted to the first latent image, a liquid removal or evaporation means 81 removes the liquid component from the black liquid toner and the toner is fixed upon the first latent image or first image at image fixing means 82. Station A comprises components 79, 80, 81 and 82. Conventional fixing methods such as pressure fixing, spray fixing, heat fixing, combination of these or any other suitable fixing means may be used at fixing means 82. Once the first image has been fixed, the dielectric film 76 is advanced to unit station B where a second print head 83 deposits a second latent electrostatic image upon dielectric layer 76. This second latent electrostatic image on the dielectric layer 76 is then advanced to a second toner reservoir 84 containing a cyan liquid toner. The second toner is made up of a toner identified as CPA-04 manufactured by Research Labs of Australia, Adelaide, Australia. After the cyan liquid toner contacts the latent image and the toner particles therein are attracted to the second latent image, the liquid component of the cyan liquid toner is removed at liquid removal means 85 and the remaining toner fixed upon the first toned or developed image by fixing means 86. Station B comprises elements or components 83, 84, 85 and 86 and all subsequent stations will be made up of similar components. At unit station C the first and second imaged dielectric layer 76 is image charged by a third ion projection head 87 to provide a third latent electrostatic image. This third image is advanced to a third liquid developer or toner reservoir 88 made up of a magenta color toner. This toner is designated MPA-02 manufactured by Research Labs of Australia, Adelaide, Australia. After the magenta toner is attracted to the third latent image, the liquid portion of the toner is removed at evaporation or liquid removal means 89 and the remaining magenta toner fixed in place at fixing means 90. The imaged dielectric layer 76 is then advanced to unit station D where a fourth latent electrostatic image is deposited thereon by ion projection cartridge or head 91. As in previous stations, the imagewise information is electrically communicated to each print head which then responds with the corresponding image deposition of ions upon the dielectric layer 76. This fourth latent image is moved to a fourth liquid toner reservoir 92 where a yellow toner identified as YPA-03 manufactured by Research Labs of Australia, Adelaide, Australia is deposited in fourth imagewise configuration upon the dielectric layer. The liquid developer is then dried at liquid removal means 93 and the fourth image fixed at fixing means 94. The resulting colored image is then overcoated at lamination station 95 with a visibly clear material such as polyvinylchloride. This overcoating 96 may be sprayed onto imaged dielectric layer 76 or as a film overcoating layer 96 or any suitable overcoating means may be used. The overcoating 96 has a thickness of about from 3–20 mils but may be thicker if desirable. An adhesive may be used to provide better adhesion of the overcoating 96 (if a film) to the imaged dielectric layer 76. Overcoating 96 may be applied as a spray, as a film or in any other suitable manner. The resulting two-layer film (layers 76 and 96) is then advanced as product layer 97, dried at drying station 98 and removed from the system at separation station 99.

Any number of unit stations greater than two may be used in the process and apparatus of the second embodiment of this invention. An important feature is to provide a system for color imaging where the registration is simple and effective. This can be done in the present system with two or more images. An additional step subsequent to air drying at drying station 98 may be used in the present system; that is, where a thicker substrate is attached to the underside (non-imaged) face of produced layer 97. This substrate may be a base layer used for example in tiles, wallpaper, ceiling products or floor products and the like. This step is not shown in the drawing since it and many other post-process steps may be used to combine product layer 97 with a multitude of other materials or objects. For ease of handling, the dielectric film used in the invention is preferably about 0.5 to about 3.0 mils thick, however, any thickness up to about 10.0 mils or more may be used.

The preferred and optimally preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A non-impact printer comprising in combination a dielectric layer dispensing means, for dispensing a dielectric layer an endless conduction belt, at least one electrostatic print head, at least one developer station, at least one toner fixing station, at least one lamination station and a separation station, forming in combination thereby a printing system, said dielectric layer dispensing means having means to provide a substantially continuous dielectric layer upon said endless belt at a point in said system prior to said print head, means to maintain said continuous dielectric layer upon said endless belt subsequent to said electrostatic print head, said developer station having means to develop a latent electrostatic image deposited upon said continuous dielectric layer by said print head, said lamination station being positioned subsequent to said developer station and having means to deposit a lamination overcoating upon an electrographically imaged and developed surface of said dielectric layer to form a laminated imaged dielectric layer, and said separation station having means subsequent to said developer station and said lamination station to separate substantially all of said laminated imaged substantially continuous dielectric layer from said endless conductive belt.

2. The printer of claim 1 wherein said system is a monochromatic system.

3. The printer of claim 1 wherein said system is a multicolor system.

4. The printer of claim 1 wherein said dielectric layer dispensing means has means to supply said dielectric layer at a thickness of at least 0.2 mils.

5. The printer of claim 1 wherein said dielectric layer dispensing means has means to supply said dielectric layer at a thickness of about 0.2 mil to about 10.0 mils.

6. The printer of claim 1 wherein said dielectric layer dispensing means has means to deposit a dielectric layer upon said endless conductive belt in a liquid formulation, said printer having means to subsequently remove a liquid portion therefrom to form a dielectric layer capable of receiving and holding a latent electrostatic image.

7. The printer of claim 1 wherein said system includes means for lamination of fixed images subsequent to each image fixing.

8. The printer of claim 1 wherein said system has means to provide at least one additional imaging cycle subsequent to separation of said dielectric layer from said endless belt.

9. The printer of claim 1 having means in said system subsequent to said lamination station to attach a base or substrate to an unimaged surface of said laminated dielectric layer.

10. The printer of claim 1 having film dispensing means to supply said dielectric layer to the surface of said endless belt at a point in said system prior to said print head.

11. A non-impact printer comprising an endless conductive belt, a dielectric layer on said endless belt, at least one print head for imagewise charging said dielectric layer, at least one image developer station, at least one developer liquid removal station, at least one toner fixing station, at least one lamination station and a separation station to provide in combination a printing system, means to deposit a first dielectric layer upon said endless conductive belt, said dielectric layer having a substantially continuous surface capable of receiving and retaining an electrostatic latent image, said endless conductive belt having means to advance said endless conductive belt through each of the stations, means to recycle said dielectric layer to a print head for at least a second imagewise charging, and means for continuously advancing beyond a last separation station, means at said separation station for removing substantially all of said first dielectric layer from said endless conductive belt, means to advance said endless conductive belt beyond said separation station to means capable of depositing at least a second dielectric layer upon said endless conductive belt and means to forward said second dielectric layer to said print head and continuously through subsequent stations.

12. The printer of claim 11 having a plurality of toner developer stations.

13. The printer of claim 11 having a plurality of print heads positioned prior to said developer stations.

14. The printer of claim 11 having means for applying an adhesive to said dielectric layer prior to a lamination station and subsequent to imaging of said dielectric layer.

15. The printer of claim 11 having means for providing a substrate for said dielectric layer, said means being positioned in said system subsequent to said separation station.

16. The printer of claim 11 wherein said system comprises sequentially at least one of each of the following: a first dielectric layer dispensing station, a dielectric discharging station, a print head imaging station, an image developing station, a liquid evaporation station, an image fixing station, an adhesive applying station, a substrate dispensing station, a lamination station and a separation station, said printer having means for repeating advancements of said endless conductive belt through multiple passes of said stations.

17. The printer of claim 11 wherein all of said dielectric layers have a thickness of at least 0.2 mils.

18. The printer of claim 11 wherein all of said dielectric layers have a thickness of from about 0.2 mils to about 10.0 mils.

19. The printer of claim 11 wherein all of said dielectric layers are deposited upon said endless conductive belt in a liquid formulation and having means to subsequently remove a liquid portion therefrom to form a dielectric layer capable of receiving and holding a latent electrostatic image.

20. An electrographic process which comprises in at least one sequence the following steps: supplying a continuous dielectric layer to a surface of an endless conductive belt, electrically discharging at least one surface of said continuous dielectric layer, providing an electrostatic imagewise charge upon a previously discharged surface of said continuous dielectric layer, subsequently passing said continuous dielectric layer through a developer station and a developer-liquid removal station wherein said imagewise charge is made into a visible image, fixing said visible image to the surface of said continuous dielectric layer, overcoating said visible image with a lamination layer, fixing said lamination layer to said surface of said continuous dielectric layer to form a laminated-imaged continuous dielectric layer, removing substantially all of said laminated-imaged continuous dielectric layer from said endless conductive belt, cleaning said endless conductive belt and repeating said steps to obtain a desired product.

21. The process of claim 20 wherein said dielectric layer is supplied to the surface of said endless conductive belt by depositing a liquid containing the dielectric upon said surface, evaporating off the liquid portion forming thereby a dielectric layer having appropriate electrographic properties.

22. The process of claim 20 wherein said dielectric layer is supplied to the surface of said endless belt by a dielectric film dispensing means.

23. The process of claim 20 wherein said dielectric layer is sequentially imaged, developed and fixed in a plurality of passes prior to said lamination.

24. The process of claim 20 wherein said dielectric layer is sequentially imaged, developed and fixed in a plurality of passes and said lamination deposited on each developed image on each pass.

25. The process of claim 20 wherein at a substrate station a thicker substrate is provided on a surface of said dielectric layer opposite to said laminated-image dielectric layer said substrate station provided before removing said laminated-imaged dielectric layer from said endless belt.

26. The process of claim 20 wherein a 0.2 mil to 10.0 mil thick layer of dielectric material is supplied to the surface of said endless conductive belt.

27. The process of claim 20 wherein said dielectric layer is continuously supplied to said endless conductive belt subsequent to said cleaning.

28. A non-impact printer comprising in combination a conductive drum, power means to rotate said drum, a dielectric layer dispensing means, for dispensing a dielectric layer at least two image-toning stations, an overcoating station and a dielectric layer separation station forming thereby a printing system, said dielectric dispensing means having means to provide a continuous dielectric layer upon said conductive drum at a point in said system prior to a first image-toning station, at least one additional image-toning station positioned subsequent to said first image-toning station, each of said image-toning stations comprising sequentially at least one ion projection print head and at least one toning unit, said toning unit having means to tone a latent image deposited upon said continuous dielectric layer by an ion projection print head positioned immediately before said toning unit said overcoating station positioned in said system subsequent to said first image-toning station but prior to said dielectric layer separation station.

29. The printer of claim 28 wherein said image-toning stations comprise toner reservoirs of different colors.

30. The printer of claim 28 wherein said image-toning stations sequentially image charge and image tone said dielectric layer as said dielectric passes therethrough.

31. The printer of claim 28 wherein each image-toning station comprises at least one ion projection printer head, at least one reservoir of a liquid toner, and at least one liquid removal means, said liquid removal means adapted to remove liquid from a developed image.

32. The printer of claim 28 wherein each image-toning station comprises at least one ion projection printer head, at least one reservoir of a liquid toner, at least one liquid removal apparatus and at least one toner fixing means.

33. The printer of claim 28 wherein said system comprises at least one toner fixing means in each said image-toning stations at a point subsequent to said ion projection printer head and said toning unit.

34. The printer of claim 28 wherein an overcoating drying structure is positioned in said system at a point prior to said dielectric layer separation station.

35. The printer of claim 28 wherein said dielectric dispensing means continuously supplies a layer of dielectric material to the surface of said conductive drum at a rate substantially equal to the rate of removal of said dielectric layer at said dielectric layer separation station.

36. The printer of claim 28 wherein at least four image-toning stations are positioned sequentially around and above said conductive drum, each of said stations having a supply of different colored liquid toner.

37. A non-impact printer comprising in combination a conductive drum, power means to rotate said drum, dielectric layer dispensing means, for dispensing a dielectric layer at least two image-toning stations, a dielectric overcoating station and a dielectric layer separation station forming thereby a printing system, said dielectric layer dispensing means adapted to provide a dielectric layer upon said conductive drum at a point in said system prior to any image-toning station, a discharge means positioned in said system immediately after said dielectric layer dispensing means and adapted to electrically discharge a surface of said dielectric layer, a first image-toning station located after said discharge means and at least one additional image-toning station positioned subsequent to said first image-toning station each of said image-toning stations comprising at least one ion projection print head and at least one toning unit, said toning unit having means to tone or develop a latent image deposited upon said dielectric layer by an ion projection head positioned before said toning unit, said dielectric overcoating station positioned in said system subsequent to said image toning stations but prior to said dielectric layer separation station.

38. The printer of claim 37 wherein said image-toning stations comprise toner reservoirs of different colors.

39. The printer of claim 37 wherein said image-toning stations sequentially image charge and image tone said dielectric layer as it passes therethrough.

40. The printer of claim 37 wherein each image-toning station comprises at least one ion projection printer head, at least one reservoir of a liquid toner, and at least one liquid removal means, said liquid removal means adapted to remove liquid from a developed image.

41. The printer of claim 37 wherein each image-toning station comprises at least one ion projection printer head, at least one reservoir of a liquid toner, at least one liquid removal apparatus and at least one toner fixing means.

42. The printer of claim 37 wherein said system comprises at least one toner fixing means in each of said image-toning stations at a point subsequent to said ion projection printer head and said toning unit.

43. The printer of claim 37 wherein an overcoating drying structure is positioned in said system at a point prior to said dielectric layer separation station.

44. The printer of claim 37 wherein said dielectric dispensing means continuously supplies a layer of dielectric material to a surface of said conductive drum at a rate substantially equal to a rate of removal of said dielectric layer at said dielectric layer separation station.

45. The printer of claim 37 wherein at least four image-toning stations are positioned sequentially around and above said conductive drum, each of said stations having a supply of different colored liquid toner.

46. An electrophotographic process which comprises the steps of supplying a layer of a dielectric layer or material to a surface of a conductive drum, electrically discharging at least one surface of said dielectric layer, subsequently advancing said dielectric material through a series of image-toning stations, at a first station providing a first imagewise latent electrostatic charge upon the previously discharged surface of said dielectric layer, passing said latent electrostatic charge to a first toning means where said latent electrostatic charge is made into a visible image, fixing said visible image to the surface of said dielectric layer, subsequently advancing said dielectric layer to at least a second station where a second latent electrostatic image is deposited upon said dielectric layer and then toned at a second toning means where said second latent electrostatic image is made into a second visible image, fixing said second visible image, continuing said process until a desired final colored image is obtained, overcoating said desired final colored image with an overcoating and removing or separating a resulting imaged and overcoated dielectric layer from said drum.

47. The process of claim 46 wherein a different color is provided at each of said image-toning stations.

48. The process of claim 46 wherein a different latent electrostatic image is provided at each of said image-toning stations.

49. The process of claim 46 wherein each of said image-toning stations has means to deposit a different latent image upon said dielectric material, and has means to tone said different latent image with a color toner different from the other image-toning stations.

50. The process of claim 46 wherein each toned image is fixed prior to advancing to a next image-toning station.

51. The process of claim 46 wherein said dielectric layer is advanced through at least four image-toning stations prior to removing said imaged and overcoated dielectric layer from said drum, 52. The process of claim 46 wherein said substantially clear overcoating is dried prior to removing said imaged and overcoated dielectric layer from said drum.

53. The process of claim 46 wherein each image formed and toned at each image-toning station is superimposed over or combined with previous images formed to provide thereby a colored image.

* * * * *